United States Patent Office 3,422,041
Patented Jan. 14, 1969

3,422,041
USE OF REACTIVE LIGNOCELLULOSE AS ADDITIVE FOR EPOXY RESINS
Ronald L. Broadhead, Addison, and William R. Dunlop, Maywood, Ill., assignors to The Richardson Company, Melrose Park, Ill., a corporation of Ohio
No Drawing. Filed Feb. 7, 1966, Ser. No. 525,385
U.S. Cl. 260—9                                                 7 Claims
Int. Cl. C08g 51/18; C08g 45/00

ABSTRACT OF THE DISCLOSURE

Epoxy resins of improved cure characteristics are prepared using as an additive reactive lignocellulose containing at least 10 weight percent of curable resin having numerous active phenolic groups and derived from a 2-step substantially dry steam and heat treatment of a mixture of lignocellulose and a phenolic agent.

---

This invention relates to epoxy resins and, more particularly, to the use of reactive lignocellulose resins with epoxy resins to produce co-cured products which are characterized by improved physical properties.

Although generally not used with epoxy resins, lignocellulose in the form of various wood products, such as wood flour, has been used extensively as a wood filler for phenolic resins. In view of the low cost and the availability of lignocellulose, it would be advantageous to extend the usefulness of lignocellulose to epoxy resins.

We have discovered that a phenolic and steam treated lignocellulose characterized by at least 10 weight percent of a reactive lignocellulose resin having numerous active phenolic groups can be used advantageously with epoxy resins to produce cured products which are characterized by increased hardness. The phenolic groups are chemically combined in the reactive resin and have at least one active or unhindered site in the ortho and/or para positions of each phenyl group. Numerous active phenolic groups are present in the reactive resin. Based on an average, these active phenolic groups exceed a value of one per each unit or building block of the lignocellulose resin and more usually range in the order of about 2–5 groups per unit. The performance of the lignocellulose filler is believed to be related to the presence of these active phenolic groups and to the amount of the reactive resin present in the lignocellulose filler.

We have found that the cured products exhibit hardness values which significantly exceed those of both unmodified, cured epoxy resins and cured epoxy resins prepared with an untreated lignocellulose filler. Through the use of the treated lignocellulose with its characteristic reactive resin, we have provided a low cost and readily available reactive filler or extender for epoxy resins, which not only provides useful cured epoxy resins but also provides improved physical properties to the resins.

Briefly, the invention is directed to the process of producing epoxy resins which are characterized by increased hardness and by a presence of a reacted lignocellulose resin. The process comprises reacting an uncured epoxy resin with a phenolic and steam treated lignocellulose characterized by at least 10 weight percent of a reactive lignocellulose resin having numerous active phenolic groups under curing conditions and in the presence of a curing agent to produce the cured resin.

The invention is also directed to the cured product and to the stable mixture of the uncured epoxy resin and treated lignocellulose without the curing agent.

The phenolic and steam treated lignocellulose characterized by at least 10 weight percent of a reactive lignocellulose resin having numerous active phenolic groups is prepared by the processes described in the copending applications Ser. No. 408,350 and Ser. No. 408,351, and now abandoned; which processes are incorporated herein by reference. The phenolic and steam treated lignocellulose, as disclosed in these copending applications, is made by subjecting raw lignocellulose to steam treatment in the presence of a phenolic agent in a confined atmosphere for a predetermined period. In one process, the products are obtained by subjecting sawdust, wood chips or similar raw, unmodified lignocellulose in combination with a phenolic agent, such as phenol, a cresol, a xylenol, mixtures thereof, etc., initially to the acttion of substantially dry steam for from 1 to 10 minutes, reducing the pressure within the reaction mass to below 100 p.s.i., and then again subjecting the mass to the action of the substantially dry steam for a second period of from 1 to 10 minutes. The temperature of the steam ranges between 400° F. to 470° F. In this process the lignins and possibly certain hemicellulosic components are chemically modified and converted into an unusually high amount of resinous material characterized by active phenolic groups. The amount of such resin thus obtained is at least 10 weight percent and usually at least 20 weight percent of the final product and generally is in the range of about 25–30 weight percent.

In the second process an even higher amount of resinous component with its active phenolic groups is obtainable through the use of an acid catalyst soluble in the phenolic agent. With this second process a resin content of 40 percent or more by weight is generally obtained.

The above defined phenolic and steam treated lignocellulose provides advantages when used with uncured epoxy resins. These epoxy resins may also be characterized as polyepoxide resins or resin-forming systems. Polyepoxides are characterized by the presence of a plurality of epoxy groups

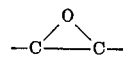

sometimes referred to as "oxirane groups." Polyepoxides may be aliphatic, aromatic, cycloaliphatic or heterocyclic and may contain substituents, such as hydroxyl groups or halogen atoms, etc. Many epoxies currently in use are polyglycidyl ethers obtained by the reaction of epichlorohydrin with a polyhydric compound in the presence of an alkaline medium. These polyhydric compounds may be polyhydric alcohols or polyhydric phenols. Polyhydric alcohols, which may be reacted with epichlorohydrin, for example, to produce polyglycidyl ethers are exemplified by glycerol, propylene glycol, butylene glycol, sorbitol, mannitol and the like. Polyhydric phenols are exemplified by phenol, resorcinol and bisphenols, such as 2,2-bis(4-hydroxyphenyl)propane. Additionally, epoxylated novolaks have gained some acceptance, these compounds being obtainable by reacting epichlorohydrin in an alkaline medium with fusible phenol-formaldehyde condensation products.

Additional polyepoxides capable of being cured to a hard, infusible state are those obtained through the peracetic acid route and are exemplified by dicyclopentadiene diepoxide and epoxidized triglycerides, such as epoxidized soybean soil.

For further disclosure of the various types of epoxy resin or resin-forming compounds which may be used in combination with the present curing agents, reference is made to numerous examples referred to in the patents to Shokal 2,915,485 and Schroeder 3,903,381. Additionally, the publications by Skeist, "Epoxy Resins," 1958, and by Lee and Neville, "Epoxy Resins," 1959, also may be referred to for a disclosure of various epoxy resins which may be employed and processes for making the same.

Curing of the epoxy resin and lignocellulose filler is carried out under the general conditions of time and elevated temperature for epoxy resins to produce the cured product. Usually, temperatures in the order of 150–400° F. are suitable with the times of cure varying accordingly. Advantageously, the temperatures are in the order of 300–400° F.

The following example illustrates some of the embodiments of this invention. It is to be understood that this is for illustrative purposes only and does not purport to be wholly definitive as to conditions or scope.

EXAMPLE I

A reactive lignocellulose resin was incorporated into an uncured epoxy resin and the combination was cured to a hard, infusible product. The degree of cure was measured by the Barcol Hardness Test. Controls with other forms of lignocellulose and with no lignocellulose were also produced and tested. The other forms were wood flour and steam treated wood flour (without the phenolic treatment).

The reactive lignocellulose resin was prepared by the reaction of wood flour with 10–15 percent by weight of cresylic acids in the presence of steam at 300–450 p.s.i. A para-toluenesulfonic acid catalyst was also utilized in some preparations. The wood flour, intimately mixed with the cresylic acid (with or without the acid catalyst), was subjected to steam at about 320 p.s.i. for two minutes. After substantial release of the pressure, it was raised again to about 320 p.s.i. for two minutes.

In each test, other than the unfilled control, about 44.7 parts by weight of a diglycidal ether of bisphenol A (with an epoxy equivalent weight of about 187) were mixed with about 33.5 parts by weight of an adduct from maleic anhydride and cyclopentadiene as a curing agent, about 1.8 parts by weight of a tertiary amine catalyst, and about 20 parts by weight of the filler in a small open vessel. The preparation of the unfilled control was the same except that no lignocellulose filler was used.

In each test, the mixture was poured into aluminum dishes for curing and heated for about one hour at 150° F., one hour at 250° F. and one hour at 350° F. to produce cure. The degree of cure was measured by Barcol hardness. The results appear below in Table I.

| Test | Filler | Hardness |
| --- | --- | --- |
| 1 | None | 81 |
| 2 | Wood flour (80 mesh Ponderosa pine) | 81 |
| 3 | Steam treated wood flour (no phenolic treatment) | 80 |
| 4 | Phenolic and steam treated wood flour (10 weight percent cresol) | 87 |
| 5 | Phenolic and steam treated wood flour (15 weight percent cresol and para-toluene sulfonic acid) | 86 |

The above results in Tests 1, 2 and 3 demonstrate that the hardness of the cured products was not increased by the wood flour and steam treated, wood flour fillers. These results also indicate that any effect on cure by these fillers was very slight, if any. In Tests 4 and 5, the results demonstrate that the phenolic and steam treated fillers increased the hardness from 81 to 86 for Test 3 and to 87 for Test 4. These results also indicate that a reaction had occurred between the filler and the epoxy resin to produce an improved cure with the resultant increased hardness.

While the invention has been described in conjunction with a specific example thereof, this is illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:
1. A process of preparing epoxy resins characterized by improved cure as measured by hardness and by the presence of a reacted lignocellulose filler, which process comprises reacting an uncured epoxy resin containing a plurality of epoxy groups with a phenolic and steam treated lignocellulose filler characterized by at least 10 weight percent of a reactive lignocellulose resin having numerous active phenolic groups and derived by subjecting a mixture of lignocellulose and a phenolic agent from the class consisting of phenol, cresols and xylenols in a closed chamber to the action of substantially dry steam at a temperature of between about 400° F. to 470° F. initially for a period of 1–10 minutes, reducing the pressure in said chamber to below 100 p.s.i., and then reintroducing into said chamber substantially dry steam at a temperature of between about 400° F. to 470° F. for a period of 1 to 10 minutes, said reaction being carried out under curing conditions and in the presence of a curing agent.

2. The process of claim 1 wherein said lignocellulose contains at least 20 weight percent of said reactive lignocellulose resin.

3. A cured epoxy resin comprising the product of claim 1.

4. A coated article having as the coating a cured epoxy resin product of claim 1.

5. As a composition of matter, a stable mixture of an uncured epoxy resin containing a plurality of epoxy groups and a phenolic and steam treated lignocellulose filler containing at least about 10 weight percent of a reactive lignocellulose resin having numerous active phenolic groups and derived by subjecting a mixture of lignocellulose and a phenolic agent from the class consisting of phenol, cresols and xylenols in a closed chamber to the action of substantially dry steam at a temperature of between about 400° F. to 470° F. initially for a period of 1–10 minutes, reducing the pressure in said chamber to below 100 p.s.i., and then reintroducing into said chamber substantially dry steam at a temperature of between about 400° F. to 470° F. for a period of 1 to 10 minutes.

6. The mixture of claim 5 wherein said reactive lignocellulose resin is present in at least about 20 weight percent of said filler.

7. A molded article formed by molding under heat and pressure the mixture of claim 5.

References Cited

UNITED STATES PATENTS 2,156,160 4/1939 Olsen et al. 260—9
3,149,085 9/1964 Ball et al. 260—9

WILLIAM H. SHORT, *Primary Examiner.*

E. M. WOODBERRY, *Assistant Examiner.*